United States Patent
He

(10) Patent No.: US 7,219,110 B2
(45) Date of Patent: May 15, 2007

(54) TESTING A DATABASE TRANSACTION SYSTEM WITHOUT MODIFYING A DATABASE

(75) Inventor: Xiaoqiu He, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 621 days.

(21) Appl. No.: 10/232,485

(22) Filed: Aug. 30, 2002

(65) Prior Publication Data
US 2004/0044699 A1   Mar. 4, 2004

(51) Int. Cl.
G06F 17/30   (2006.01)

(52) U.S. Cl. .............................. 707/201; 707/1; 707/8; 711/162

(58) Field of Classification Search .............. 707/1–10, 707/100–104.1, 200–206; 709/203, 201; 718/101
See application file for complete search history.

(56) References Cited

U.S. PATENT DOCUMENTS

| | | | |
|---|---|---|---|
| 5,781,910 A * | 7/1998 | Gostanian et al. | 707/201 |
| 5,958,004 A * | 9/1999 | Helland et al. | 718/101 |
| 6,233,585 B1 * | 5/2001 | Gupta et al. | 707/103 R |
| 6,799,188 B2 * | 9/2004 | Weedon | 707/202 |

OTHER PUBLICATIONS

Elmootazbellah N. Elnozahy et al., Manetho: transparent Rollback-Recovery with Low Overhead, Limited Rollback, and Fast Output Commit, IEEE, 1992, 526-531.*

J. Hamilton Slye et al., Support for Software Interrupts in Long-Based Rollback-Recovery, IEEE, 1998, 1113-1123.*

* cited by examiner

Primary Examiner—John Breene
Assistant Examiner—Jean Bolte Fleurantin
(74) Attorney, Agent, or Firm—Hickman Palermo Truong & Becker LLP; Christian A. Nicholes

(57) ABSTRACT

A mechanism for testing a database transaction system without modifying a database is provided. A transaction commit instruction, sent by a transaction manager, is intercepted. The transaction commit instruction is intended to instruct a database driver to cause a transaction to be committed. The transaction commit instruction is prevented from reaching the database. A failure signal is sent back to the transaction manager to indicate a failure to commit the transaction even though the database has not experienced the failure. This enables a failure to be simulated without causing a database to suffer any adverse effects.

7 Claims, 3 Drawing Sheets

TESTING A DATABASE TRANSACTION SYSTEM WITHOUT MODIFYING A DATABASE

FIELD OF THE INVENTION

The present invention relates to databases. More specifically, the present invention relates to testing a database transaction system without modifying a database.

BACKGROUND OF THE INVENTION

If a database transaction is specified to be an atomic transaction, then the effect of that transaction on a database must either be entirely complete if that transaction succeeds, or entirely absent if that transaction fails. A partial effect is unsatisfactory. A single atomic transaction may affect multiple databases. At the conclusion of such a transaction, a commit instruction is sent by a transaction manager to each of the databases affected by that transaction. It is possible for the commit instruction to succeed relative to one of these databases but to fail relative to another of these databases. Because the transaction is specified to be an atomic transaction, the effect of the transaction relative to all databases must be rolled back whenever the transaction fails relative to any database.

Therefore, when a commit instruction of an atomic transaction fails relative to a certain database, a database driver associated with that certain database should responsively send a failure signal to the transaction manager. Upon receiving the failure signal, the transaction manager should responsively send a rollback instruction to database drivers associated with each of the other databases affected by the transaction. Upon receiving the rollback instruction, a database driver should perform a rollback operation relative to that driver's associated database. The rollback operation should cause the effects of the transaction relative to that database to be negated; in other words, after the rollback operation, that database should include only data included in that database prior to the start of the transaction.

One approach to testing whether the rollback operation was actually performed after a transaction failed involves inducing an actual failure relative to one of the databases whose driver receives the commit instruction. Inducing an actual failure may cause erroneous data to be contained in that database. Inducing an actual failure may also cause the driver associated with that database to end execution. When that database and its associated driver are concurrently involved in other transactions unrelated to the testing, those other transactions may be adversely affected. Furthermore, inducing an actual failure may require modification of the database driver, which may be time-consuming and may introduce errors into the database driver. Where several multiple-database environments are to be tested, modifications made to a database driver in one environment may not be portable to different database drivers in other environments.

SUMMARY OF THE INVENTION

A mechanism is provided for testing a database transaction system without modifying a database. A transaction commit instruction, sent by a transaction manager, is intercepted. The transaction commit instruction is intended to instruct a database driver to cause a transaction to be committed. The transaction commit instruction is prevented from reaching the database. A failure signal is sent back to the transaction manager to indicate a failure to commit the transaction even though the database has not experienced the failure. This enables a failure to be simulated without causing a database to suffer any adverse effects.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for testing a database transaction system without modifying a database is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Introduction

A transaction commit instruction, sent by a transaction manager, is intercepted. The transaction commit instruction is intended to instruct a database driver to cause a transaction to be committed. The transaction commit instruction is prevented from reaching the database. A failure signal is sent back to the transaction manager to indicate a failure to commit the transaction even though the database has not experienced the failure.

Because the commit instruction does not reach the database, the database is not modified as a result of the commit instruction. Consequently, erroneous data is not introduced into the database, and the database driver need not end execution. Therefore, if the database and the database driver are concurrently involved in other transactions that are unrelated to the transaction that includes the commit instruction, then those other transactions are not adversely affected.

Testing System

Figure 1:
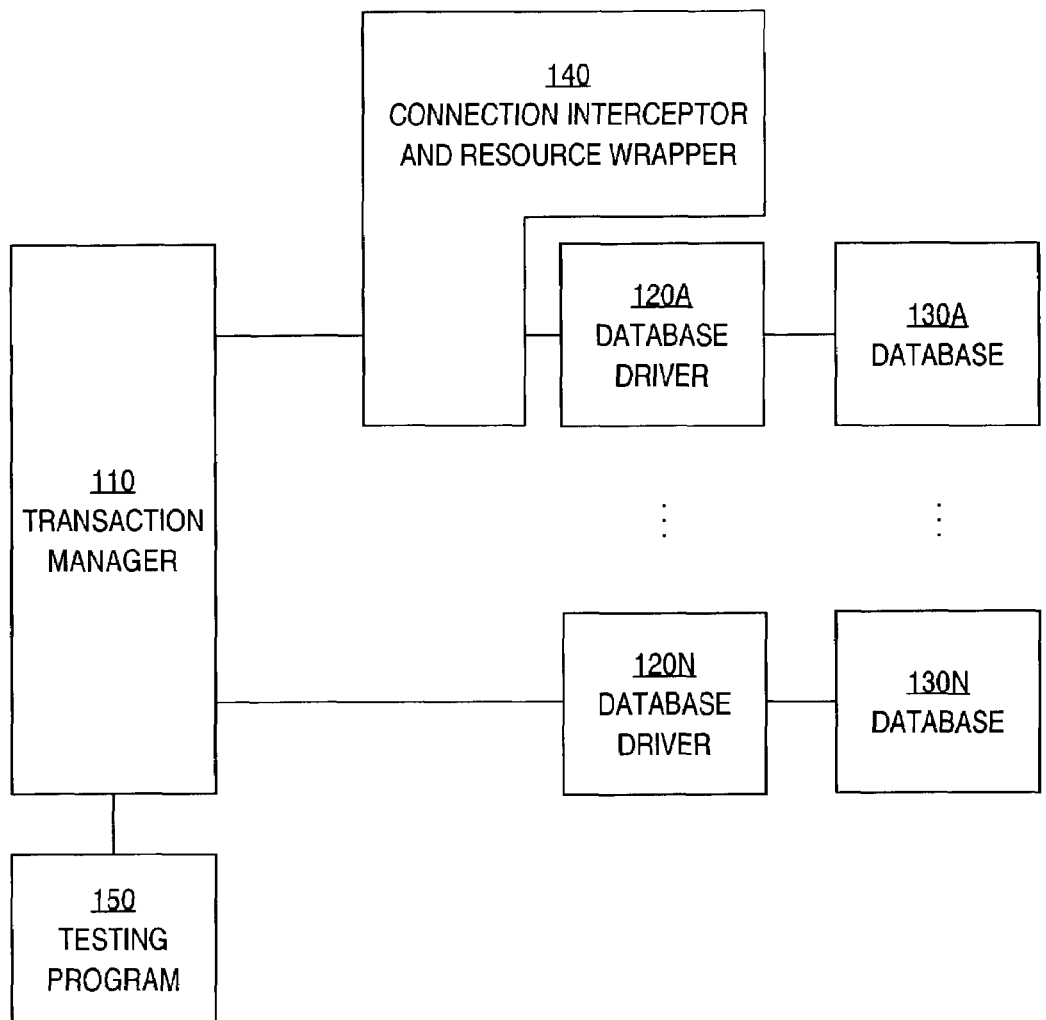
FIG. 1 is a block diagram that illustrates a system for testing a database transaction system without modifying a database, according to an embodiment of the invention.

FIG. 1 is a block diagram that illustrates a system for testing a database transaction system without modifying a database, according to an embodiment of the invention. The system includes transaction manager 110, database drivers 120A–N, databases 130A–N, connection interceptor and resource wrapper 140, and testing program 150.

Testing program 150 is logically coupled with transaction manager 110. Transaction manager 110 is logically coupled with database drivers 120A–N. Transaction manager 110 is logically coupled to connection interceptor and resource wrapper 140. Transaction manager 110 is logically coupled to database driver 120A through connection interceptor and resource wrapper 140. Each of database drivers 120A–N is logically coupled with an associated one of databases 130A–N.

Transaction Manager 110

Transaction manager 110 is a database transaction manager such as is well known, and therefore needs not be described in great detail herein. In one embodiment of the invention, transaction manager 110 is capable of enlisting any database resources that will be involved in a transaction, performing one or more transaction operations relative to those database resources, and then un-enlisting (or "delisting") those database resources when the transaction is finished. These database resources may include instances of database resource classes (i.e., database resource objects).

For example, one database resource class is the XADatasource class specified by the Java Transaction Application Programming Interface (JTA). Each database resource object corresponds to a database, such as database 130A. In one embodiment of the invention, transaction manager 110 is capable of establishing a real database connection by calling XADatasource, XAConnection, and XAResource objects. These objects are instances of classes specified by the JTA.

Transaction manager 110 is also capable of instructing database drivers 120A–N. For example, transaction manager 110 is capable of instructing one or more of database drivers 120A–N to perform a commit operation or a rollback operation. Transaction manager 110 is also capable of receiving signals. For example, transaction manager is capable of receiving a failure signal that indicates that a commit operation has been unsuccessful relative to one of databases 130A–N.

Database Drivers 120A–N

Database drivers 120A–N are well known, and therefore need not be described in great detail herein. In one embodiment of the invention, each of database drivers 120A–N is capable of communicating with an associated database, such as one of databases 130A–N. Database drivers 120A–N may include instances of database driver classes. For example, one database driver class is the XA driver class specified by the JTA. An instance of an XA driver class (i.e., an XA driver object) is capable of instantiating an XADatasource object.

Databases 130A–N

Databases 130A–N are well known, and therefore need not be described in great detail herein. In one embodiment of the invention, each of databases 130A–N corresponds to an instance of a database resource class, such as an XADatasource object.

Connection Interceptor and Resource Wrapper 140

Connection interceptor and resource wrapper 140 "sit on top of" database driver 120A. Thus, connection interceptor and resource wrapper 140 are independent of database driver 120A. Connection interceptor and resource wrapper 140 implements the functionality of database driver 120A. Connection interceptor and resource wrapper 140 is capable of intercepting a commit instruction. Connection interceptor and resource wrapper 140 is also capable of sending signals. For example, connection interceptor and resource wrapper 140 is capable of sending a failure signal that indicates that a commit operation has been unsuccessful (whether or not that commit operation actually has been unsuccessful) relative to database 130A. In other words, connection interceptor and resource wrapper 140 is capable of simulating a failure relative to database 130A.

In one embodiment of the invention, connection interceptor and resource wrapper 140 includes a connection interceptor object and a resource wrapper object. The connection interceptor object is an instance of a connection interceptor class. For example, the connection interceptor class may be an XAConnection interceptor class that interacts with the JTA. The resource wrapper object is an instance of a resource wrapper class. For example, the resource wrapper class may be an XAResource wrapper class that interacts with the JTA.

The XAConnection interceptor class implements the functionality of the XAConnection class specified in the JTA. The XAResource wrapper class implements the functionality of the XAResource class specified in the JTA. For example, such functionality may include methods of classes specified in the JTA. These methods include getConnection( ), getXAResource( ), checkHeuristicFailures( ), checkXAID( ), commit( ), forget( ), getTransactionTimeout( ), recover( ), rollback( ), start( ) and end( ).

The XAConnection interceptor class and the XAResource wrapper class are independent of any database or database driver. Thus, these classes are capable of simulating a failure without modification of a database driver, helping to prevent errors from being introduced into the database driver. These classes may also be portably used with different database drivers in other environments.

Testing Program 150

Testing program 150 is capable of instructing transaction manager 110 to perform transactions. For example, a user may specify such transactions, possibly in the form of a script. Testing program 150 is also capable of preserving contents of a database and comparing those preserved contents with contents included in that database at a later time. Testing program 150 is also capable of displaying information based on such a comparison.

In one embodiment of the invention, testing program 150 is a Java Transaction Service (JTS) client. The JTS client is capable of instantiating the XAConnection interceptor and XAResource wrapper classes instead of the XAConnection and XAResource classes.

Testing Technique

Figure 2:
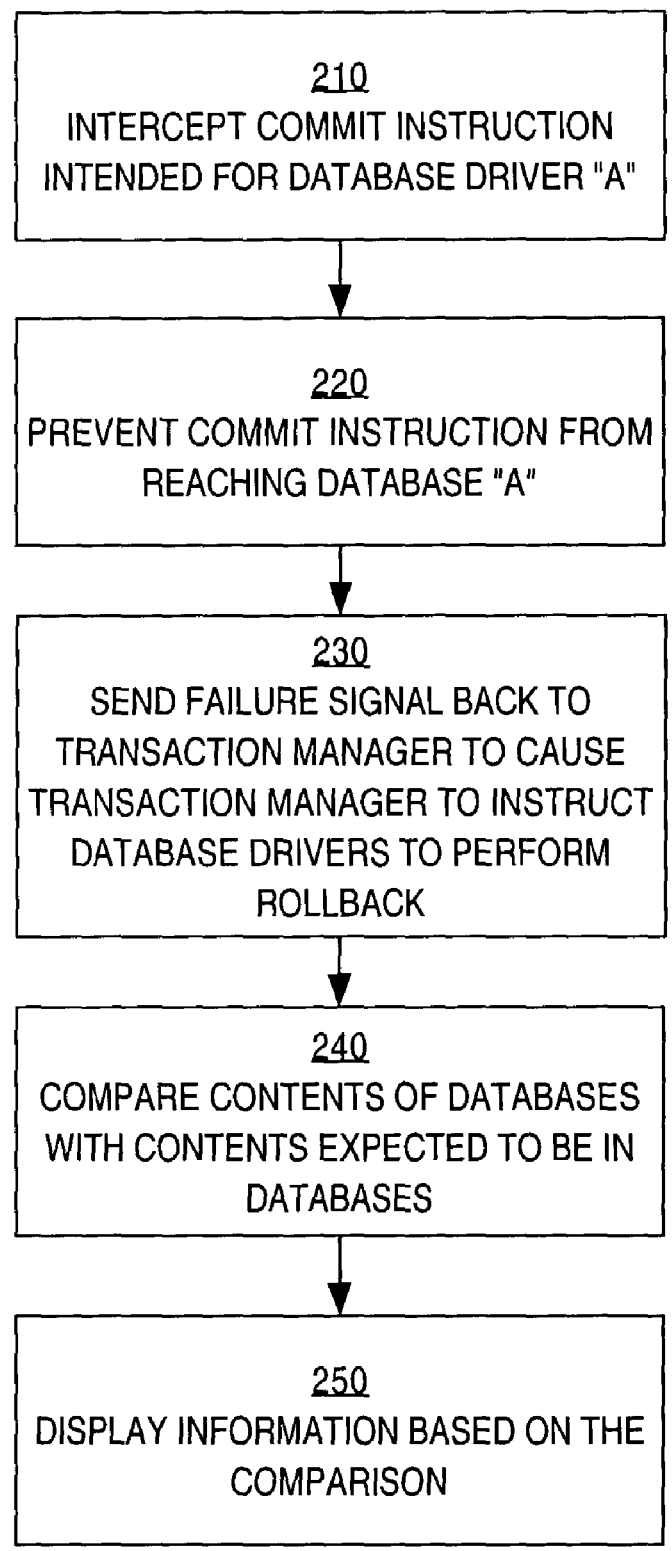
FIG. 2 is a flow diagram that illustrates a technique for testing a database transaction system without modifying a database, according to an embodiment of the invention.

FIG. 2 is a flow diagram that illustrates a technique for testing a database transaction system without modifying a database, according to an embodiment of the invention. In block 210, a commit instruction that is intended for a database driver "A" is intercepted. For example, connection interceptor and resource wrapper 140 may intercept a commit instruction that is intended for database driver 120A. Transaction manager 110 may have previously sent the commit instruction. In one embodiment of the invention, an XAConnection interceptor object intercepts the commit instruction and passes the instruction to an XAResource wrapper object.

In block 220, the commit instruction is prevented from reaching a database "A" that is associated with the database driver "A" (the database driver for which the commit instruction is intended). For example, connection interceptor and resource wrapper 140 may prevent the commit instruction from reaching database 130A (the database associated with database driver 120A). Because the commit instruction does not reach database 130A, database 130A is not modified as a result of the commit instruction. Consequently, erroneous data is not introduced into database 130A, and database driver 120A need not end execution. Therefore, if database 130A and database driver 120A are concurrently involved in other transactions that are unrelated to the transaction that includes the commit instruction, then those other transactions are not adversely affected.

In block 230, a failure signal is sent back to a transaction manager to cause the transaction manager to instruct a database driver "B" to perform a rollback of database "B" (the database associated with database driver "B"). For example, connection interceptor and resource wrapper 140 may send a failure signal back to transaction manager 110 to cause transaction manager 110 to instruct each of database drivers 120B–N to perform rollbacks of databases 130B–N (the databases associated with database drivers 120), respectively. To transaction manager 110, the failure signal appears to be the same as a failure signal usually received as a result of an actual failure. In this example, each of databases 130B–N contains data that was modified as a result of the commit instruction. In other words, the transaction, of which the commit instruction is a part, caused data to be added, updated, or deleted from each of databases 130B–N. In one embodiment of the invention, an XAConnection interceptor object sends the failure signal to the transaction manager 110.

Ideally, as a result of each of database drivers 120B–N performing a rollback relative to its associated database, each of those associated databases will include only data included in that database prior to the start of the transaction. To test if that condition exists, in block 240, the contents of database "B" are compared with contents expected to be in database "B". For example, testing program 150 compares contents of each of databases 130B–N with contents of databases 130B–N preserved prior to the start of the transaction.

In block 250, information is displayed based on the comparison. For example, if contents of each databases 130B–130N match the contents of databases 130B–N that were preserved prior to the start of the transaction, then testing program 150 displays information that indicates that the rollback was successful and that the system and its component elements behaved according to specification. If the two contents do not match, then testing program 150 displays information that indicates that the rollback was not successful and that some element of the system did not behave according to specification. Testing program 150 may displayed information that identifies any misbehaving element and/or any disparity in the contents.

Hardware Overview

Figure 3:
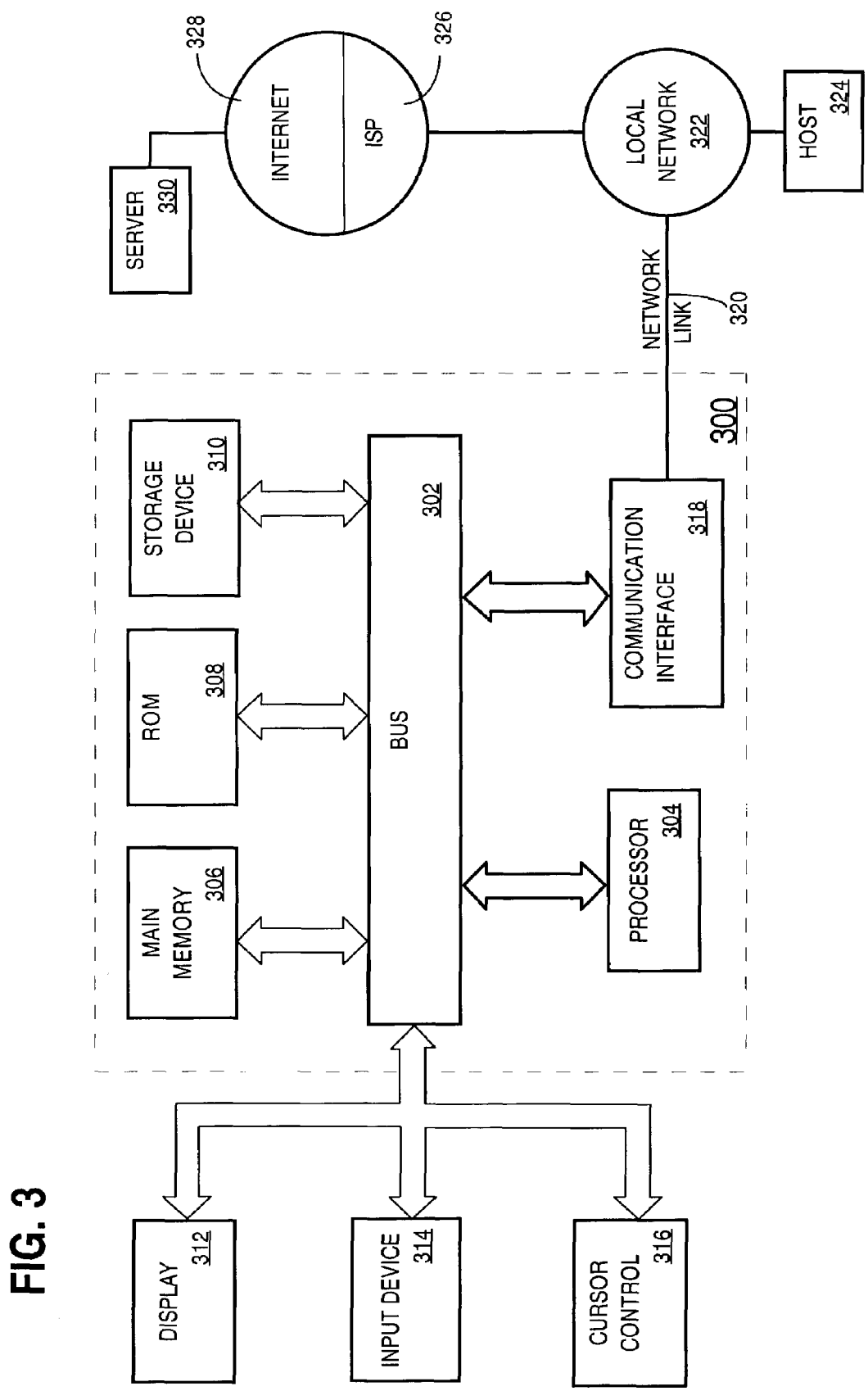
FIG. 3 is a block diagram that illustrates a computer system 300 upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

Processor 304 may execute the received code as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method comprising:
   intercepting a transaction commit instruction sent by a transaction manager, wherein the transaction commit instruction is intended to instruct a first database driver to cause a transaction to be committed;
   preventing the transaction commit instruction from reaching a first database;
   sending a failure signal back to the transaction manager to indicate a failure to commit the transaction after the transaction manager sent the commit instruction, even though the first database has not experienced the failure;
   wherein the sending the failure signal back to the transaction manager includes sending the failure signal back to the transaction manager to cause the transaction manager to instruct a second database driver to perform a rollback operation to negate effects of the transaction commit instruction relative to a second database;
   comparing contents of the second database with contents expected to be in the second database; and
   displaying information based on the comparing.

2. The method of claim 1, wherein the preventing the transaction commit instruction from reaching the first database includes preventing the transaction commit instruction from reaching the first database without modifying the first database or the first database driver.

3. A computer-readable medium carrying one or more sequences of instructions, wherein execution of the one or more sequences of instructions by one or more processors causes the one or more processors to perform the steps of:
   intercepting a transaction commit instruction sent by a transaction manager, wherein the transaction commit instruction is intended to instruct a first database driver to cause a transaction to be committed;
   preventing the transaction commit instruction from reaching a first database;
   sending a failure signal back to the transaction manager to indicate a failure to commit the transaction after the transaction manager sent the commit instruction, even though the first database has not experienced the failure;
   wherein the sending the failure signal back to the transaction manager includes sending the failure signal back to the transaction manager to cause the transaction manager to instruct a second database driver to perform a rollback operation to negate effects of the transaction commit instruction relative to a second database;
   comparing contents of the second database with contents expected to be in the second database; and
   displaying information based on the comparing.

4. The computer-readable medium of claim 3, wherein the preventing the transaction commit instruction from reaching the first database includes preventing the transaction commit instruction from reaching the first database without modifying the first database or the first database driver.

5. An apparatus comprising:
   a mechanism for intercepting a transaction commit instruction sent by a transaction manager, wherein the transaction commit instruction is intended to instruct a first database driver to cause a transaction to be committed;
   a mechanism for preventing the transaction commit instruction from reaching a first database;
   a mechanism for sending a failure signal back to the transaction manager to indicate a failure to commit the transaction after the transaction manager sent the commit instruction, even though the first database has not experienced the failure;
   wherein the mechanism for sending the failure signal back to the transaction manager includes a mechanism for sending the failure signal back to the transaction manager to cause the transaction manager to instruct a second database driver to perform a rollback operation to negate effects of the transaction commit instruction relative to a second database;
   a mechanism for comparing contents of the second database with contents expected to be in the second database; and
   a mechanism for displaying information based on the comparing.

6. The apparatus of claim 5, wherein the mechanism for preventing the transaction commit instruction from reaching the first database includes a mechanism for preventing the transaction commit instruction from reaching the first database without modifying the first database or the first database driver.

7. A system comprising:

a transaction manager;

a plurality of databases;

a connection interceptor that is (a) logically coupled with the transaction manager and (b) capable of simulating a failure relative to at least one database in the plurality of databases;

a testing program that is (a) logically coupled with the transaction manager, (b) capable of preserving contents of at least one database in the plurality of databases, (c) capable of comparing the contents with contents included in a database at a later time, and (d) capable of displaying information that indicates that a rollback was not successful;

a plurality of database drivers logically coupled with the transaction manager and the plurality of databases;

wherein at least one database driver in the plurality of database drivers is logically coupled with the transaction manager through the connection interceptor;

wherein the connection interceptor comprises a connection interceptor object and a resource wrapper object;

wherein the connection interceptor object is an instance of an XAConnectionlnterceptor class rather than an instance of an XAConnection class;

wherein the resource wrapper object is an instance of an XAResourceWrapper class rather than an XAResource class;

wherein the connection interceptor object is capable of (a) intercepting a commit instruction sent from the transaction manager, (b) passing the commit instruction to the resource wrapper object, and (c) sending, to the transaction manager, a failure signal that causes the transaction manager to instruct the plurality of database drivers to perform rollbacks relative to the plurality of databases.

* * * * *